United States Patent
Yoshida

(10) Patent No.: US 8,997,632 B2
(45) Date of Patent: Apr. 7, 2015

(54) CYLINDER APPARATUS AND METHOD OF MANUFACTURING CYLINDER APPARATUS

(75) Inventor: Tetsuo Yoshida, Kawasaki (JP)

(73) Assignee: Hitachi Automotive Systems, Ltd., Ibaraki (JP)

( * ) Notice: Subject to any disclaimer, the term of this patent is extended or adjusted under 35 U.S.C. 154(b) by 1016 days.

(21) Appl. No.: 12/825,612

(22) Filed: Jun. 29, 2010

(65) Prior Publication Data

US 2010/0326269 A1 Dec. 30, 2010

(30) Foreign Application Priority Data

Jun. 30, 2009 (JP) ................................. 2009-155721

(51) Int. Cl.
*F16J 3/04* (2006.01)
*F16F 9/38* (2006.01)
*B60G 15/06* (2006.01)
*B60G 13/00* (2006.01)

(52) U.S. Cl.
CPC *F16J 3/045* (2013.01); *F16J 3/042* (2013.01); *F16F 9/38* (2013.01); *B60G 15/062* (2013.01); *B60G 15/063* (2013.01); *B60G 13/005* (2013.01); *Y10T 29/49826* (2015.01); *F16J 3/047* (2013.01)

(58) Field of Classification Search
USPC .......... 92/165 R, 51, 107, 171.1, 169.1, 164; 267/34, 221; 188/322.16, 322.12
See application file for complete search history.

(56) References Cited

U.S. PATENT DOCUMENTS

| | | | | |
|---|---|---|---|---|
| 3,104,916 | A * | 9/1963 | Dowling et al. | 384/16 |
| 3,149,829 | A * | 9/1964 | Baum | 267/34 |
| 3,954,255 | A * | 5/1976 | Keijzer et al. | 267/34 |
| 4,089,511 | A * | 5/1978 | Palmer | 267/221 |
| 4,392,638 | A * | 7/1983 | Kato et al. | 267/64.24 |
| 4,667,941 | A * | 5/1987 | Hayashi et al. | 267/64.16 |
| 4,795,010 | A * | 1/1989 | Kaneko | 188/322.19 |
| 5,314,045 | A * | 5/1994 | Fenn et al. | 188/322.21 |
| 7,083,028 | B2 * | 8/2006 | Fujita et al. | 188/321.11 |
| 2006/0207847 | A1 * | 9/2006 | Kojima | 188/322.12 |
| 2007/0251779 | A1 * | 11/2007 | Bauman et al. | 188/322.12 |
| 2009/0084647 | A1 * | 4/2009 | Maneyama et al. | 188/314 |

FOREIGN PATENT DOCUMENTS

JP 63-26409 2/1988
JP 2008-45738 2/2008

* cited by examiner

*Primary Examiner* — Edward Look
*Assistant Examiner* — Michael Quandt
(74) *Attorney, Agent, or Firm* — Wenderoth, Lind & Ponack, LLP

(57) ABSTRACT

A metallic protecting cover is formed from two axially split members, i.e. a first protecting cover member secured to a mounting eye, and a second protecting cover member having an overall length shorter than that of each of first and second cylinders and having a predetermined gap between itself and the second cylinder. The second protecting cover member is press-fitted into the first protecting cover member secured to the mounting eye to integrate the first and second protecting cover members into the protecting cover. Accordingly, the lower end of the second cylinder can be caulked in a state where the second protecting cover member has been temporarily assembled to the second cylinder. Thus, it is possible to ensure the required strength of the protecting cover and to increase the degree of freedom in assembly process.

5 Claims, 2 Drawing Sheets

US 8,997,632 B2

CYLINDER APPARATUS AND METHOD OF MANUFACTURING CYLINDER APPARATUS

BACKGROUND OF THE INVENTION

The present invention relates to a cylinder apparatus and a method of manufacturing a cylinder apparatus.

Japanese Utility Model Registration Application Publication No. Sho 63-26409 discloses a cylinder apparatus in which a spring seat is secured to a joint between a piston rod and a mounting eye, and one end of a dust boot is supported by the spring seat.

In Japanese Utility Model Registration Application Publication No. Sho 63-26409, the end of the piston rod is covered by the metallic spring seat. However, the portion of the piston rod projecting out of the cylinder, except the end thereof, and the end of the cylinder are covered only by the dust boot made of a plastic material. Therefore, if a pebble or the like hits the dust boot during running of the vehicle, the dust boot may be broken. In such an event, the piston rod or the end of the cylinder may be damaged.

Japanese Patent Application Publication No. 2008-45738 discloses a shock absorber (cylinder apparatus) to solve the above-described problem. The shock absorber has a first cylinder, a second cylinder provided around the outer periphery of the first cylinder with a space between itself and the first cylinder, and a third cylinder provided around the outer periphery of the second cylinder axially movably relative to the second cylinder. The third cylinder is retained at one end thereof by a bottom cover member. The bottom cover member is secured to the joint between the piston rod and the mounting eye. The overall length of the shock absorber is set not less than that of the second cylinder.

In the shock absorber (cylinder apparatus) disclosed in Japanese Patent Application Publication No. 2008-45738, however, there is no gap between the second and third cylinders, and the overall length of the third cylinder is set not less than that of the second cylinder. During assembly process, once the third cylinder has been assembled to the second cylinder, the end (mounting eye-side end) of the second cylinder cannot be staked or caulked after the bottom cover member has been assembled to the ends (mounting eye-side ends) of the first and second cylinders, for example. Therefore, the assembly of the third cylinder to the second cylinder has to be done last. Accordingly, the degree of freedom in assembly process is low, and it is difficult to streamline the manufacturing process. Another problem is that the employment of the third cylinder causes an increase in weight of the shock absorber.

SUMMARY OF THE INVENTION

An object of the present invention is to provide a cylinder apparatus capable of ensuring the required strength of the protecting cover and of increasing the degree of freedom in manufacturing process.

Another object of the present invention is to provide a method of manufacturing the cylinder apparatus of the present invention.

The present invention provides a cylinder apparatus including a protecting cover formed from a first protecting cover member and a second protecting cover member split from each other in the axial direction of the piston rod. The first protecting cover member is secured to either the piston rod or the mounting eye. The second protecting cover member has an overall length shorter than that of the cylinder and is secured to the first protecting cover member with a predetermined radial gap between itself and the cylinder. A dust boot is connected to the opening end of the second protecting cover member to cover at least a portion of the cylinder. A spring seat is secured by press fitting to the outer periphery of either the first or second protecting cover member.

In addition, the present invention provides a method of manufacturing a cylinder apparatus including a protecting cover formed from a first protecting cover member and a second protecting cover member split from each other in the axial direction of the piston rod. The method includes the step of securing a spring seat to the outer periphery of the second protecting cover member by press fitting and the step of temporarily assembling the second protecting cover member to the outer periphery of the cylinder. After the first protecting cover member has been secured to either the piston rod or the mounting eye by welding and an end of the cylinder from which the piston rod projects out of the cylinder has been staked or caulked, the second protecting cover member, which has been temporarily assembled, is secured to the first protecting cover member by press fitting.

DETAILED DESCRIPTION OF THE INVENTION

An embodiment of the present invention will be explained below with reference to the accompanying drawings. It should be noted that the upward and downward directions as seen in FIG. 1 are defined as "upward (upper)" and "downward (lower)", respectively, and that the vertical direction in FIG. 1 is defined as the "axial direction" for the sake of description.

Figure 1:
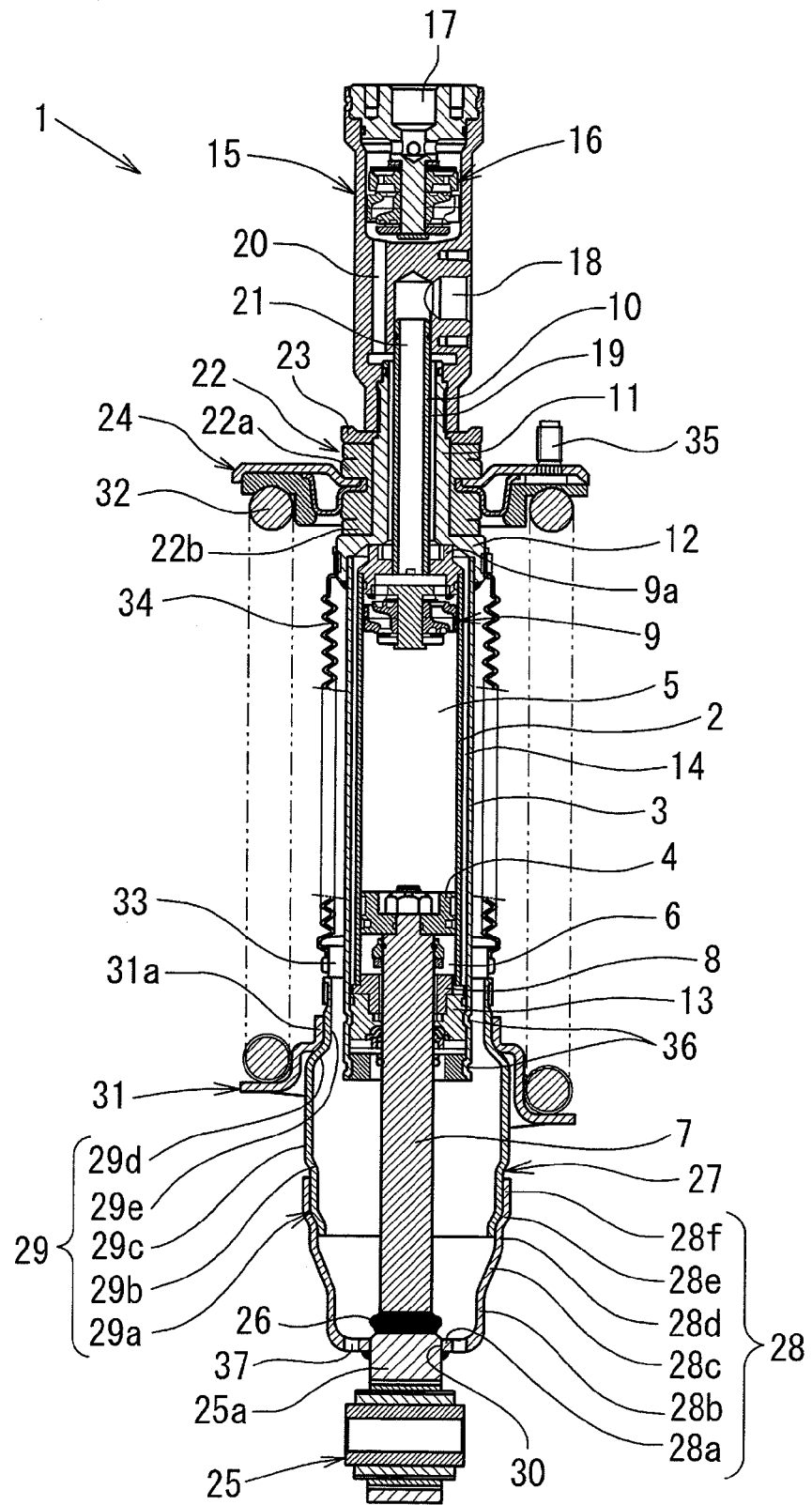
FIG. 1 is an axial sectional view of a cylinder apparatus according to an embodiment of the present invention.

As shown in FIG. 1, a cylinder apparatus 1 has a first cylinder 2 and a second cylinder 3 provided around the outer periphery of the first cylinder 2 in concentric relation to the first cylinder 2. A piston 4 is slidably fitted in the first cylinder 2. The piston 4 divides the inner space of the first cylinder 2 into an upper chamber 5 and a lower chamber 6.

The upper end of a piston rod 7 is secured to the piston 4. The piston rod 7 extends downward from the piston 4 and projects out of the first cylinder 2 through a bottom cover member 8 closing the lower end of the first cylinder 2. It should be noted that a lower chamber-side communicating passage 14 is defined between the first cylinder 2 and the second cylinder 3. The lower chamber-side communicating passage 14 is communicated with the lower chamber 6 through a predetermined passage formed between the bottom cover member 8 and the first cylinder 2.

A first tubular member 10 is connected to the upper end of the first cylinder 2 through an upper chamber-side damping valve 9 that closes the upper end of the first cylinder 2. The first tubular member 10 is provided in concentric relation to the first cylinder 2 and extends upward from the upper chamber-side damping valve 9. A second tubular member 11 is provided around the outer periphery of the first tubular member 10 in concentric relation to the first tubular member 10. The second tubular member 11 has a flange 12 formed at the lower end thereof. The upper end of the second cylinder 3 is fitted to the inner periphery of the flange 12. An annular passage 19 is formed between the first and second tubular members 10 and 11. The annular passage 19 is communicated with the lower chamber-side communicating passage 14, which is formed between the first and second cylinders 2 and 3, through a passage 9a formed in the upper chamber-side damping valve 9.

A plug member 15 is concentrically provided on the upper part of the second tubular member 11. A lower chamber-side damping valve 16 is accommodated in the plug member 15. The annular passage 19 formed between the first and second tubular members 10 and 11 is communicated with a first port 17 through a passage 20 formed in the plug member 15 and the lower chamber-side damping valve 16. A passage 21 formed in the first tubular member 10 is communicated at one end thereof with a second port 18 opened in the side surface of the plug member 15. The other end of the passage 21 is communicated with the upper chamber 5 through the upper chamber-side damping valve 9. It should be noted that the plug member 15 and the second tubular member 11 are connected together by engaging a female thread provided on the inner periphery of the plug member 15 with a male thread provided on the outer periphery of the second tubular member 11. Bush members 22a and 22b are fitted on the outer periphery of an intermediate portion of the second tubular member 11. The bush members 22a and 22b are compressed between the plug member 15 and the flange 12 through a washer 23. In addition, an annular upper spring seat 24 is provided between the bush members 22a and 22b.

Figure 2:
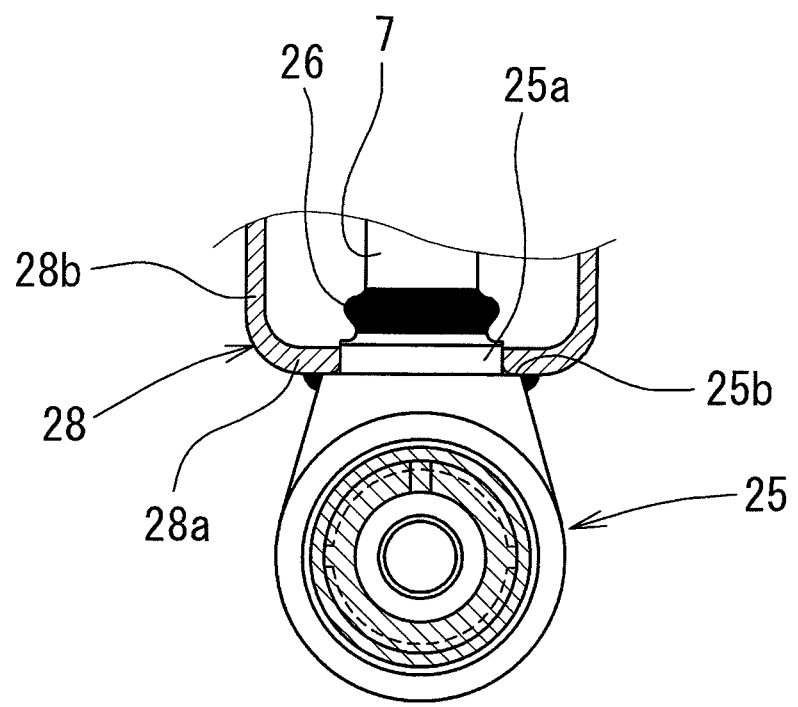
FIG. 2 is a schematic view showing a mounting structure of a first protecting cover in the embodiment shown in FIG. 1.

A mounting eye 25 is secured to the lower end of the piston rod 7. As shown in FIG. 2, the mounting eye 25 comprises a mounting eye body of horseshoe contour in front view and a shaft portion 25a provided on the center of an end surface 25b of the mounting eye body to extend upward. The shaft portion 25a of the mounting eye 25 has a larger outer diameter than that of the piston rod 7 and is joined to the piston rod 7 with a joint 26 formed by welding. As shown in FIG. 1, the piston rod 7 and the lower end of the second cylinder 3 are covered with a metallic protecting cover 27.

The protecting cover 27 is formed from two axially split members, i.e. a first protecting cover member 28 and a second protecting cover member 29. Although the protecting cover 27 used in this embodiment is made of a metallic material, by way of example, it is also possible to use a protecting cover made of other material, e.g. a resin, as long as it can bear the spring load of a coil spring 32. It is general practice that a dust boot 34 in this embodiment and dust boots generally employed have a bellows configuration to make them expandable. Accordingly, among resin materials, an elastomer, vinyl chloride or the like is usually employed with a view to facilitating the formation of a bellows configuration. However, the protecting cover 27 shown in this embodiment is not expanded or contracted during use but used to receive the spring load of the coil spring 32. Therefore, it is desirable for the protecting cover 27 to be made of a resin material selected from among those of relatively high strength. It is also desirable to select for the protecting cover 27 a resin material unlikely to expand or contract when it is subjected to the spring load of the coil spring 32.

The first protecting cover member 28 comprises a circular bottom portion 28a, a cylindrical portion 28b contiguous with the bottom portion 28a through a rounded portion and having an inner diameter larger than the outer diameter of the second cylinder 3, an enlarged-diameter portion 28c contiguous with the cylindrical portion 28b and enlarged in diameter upwardly, a cylindrical portion 28d contiguous with the enlarged-diameter portion 28c and extending upward, an enlarged-diameter portion 28e contiguous with the cylindrical portion 28d and enlarged in diameter upwardly, and a cylindrical portion 28f contiguous with the enlarged-diameter portion 28e and extending upward.

The shaft portion 25a of the mounting eye 25 is fitted in a shaft hole 30 provided in the center of the bottom portion 28a of the first protecting cover member 28, and the bottom portion 28a is abutted against an end surface 25b (retaining seat) of the mounting eye 25. In this state, the bottom portion 28a is welded to the shaft portion 25a of the mounting eye 25. Thus, the first protecting cover member 28 is secured (joined) to the mounting eye 25.

It should be noted that the bottom portion 28a of the first protecting cover member 28 is provided with a plurality of through-holes 37.

The overall length (axial length) of the second protecting cover member 29 is set shorter than the overall length of each of the first and second cylinders 2 and 3. The second protecting cover member 29 has an inner diameter that provides a predetermined gap between itself and the second cylinder 3. The provision of the predetermined gap means that the second protecting cover member 29 has a relatively large inner diameter as compared to various component parts of the cylinder apparatus 1 to allow a higher degree of freedom in the manufacturing process.

In this embodiment, the inner diameter of the second protecting cover member 29 is made larger than the outer diameter of the flange 12, which is assembled at a relatively early stage, to allow temporary assembly.

The second protecting cover member 29 comprises a press-fit portion 29a press-fitted to the inner periphery of the first protecting cover member 28 (more specifically, the inner peripheries of the cylindrical portion 28d, the enlarged-diameter portion 28e and the cylindrical portion 28f), an enlarged-diameter portion 29b contiguous with the press-fit portion 29a and enlarged in diameter upwardly, a cylindrical portion 29c contiguous with the enlarged-diameter portion 29b and having an outer diameter substantially equal to the outer diameter of the cylindrical portion 28f of the first protecting cover member 28, a reduced-diameter portion 29d contiguous with the cylindrical portion 29c and reduced in diameter upwardly, and a cylindrical portion 29e contiguous with the reduced-diameter portion 29d and having an inner diameter substantially equal to the outer diameter of the cylindrical portion 28b of the first protecting cover member 28.

An annular lower spring seat 31 is press-fitted to the outer periphery of the cylindrical portion 29e of the second protecting cover member 29.

The upper and lower ends of the coil spring 32 provided around the outer periphery of the second cylinder 3 are supported by the upper and lower spring seats 24 and 31, respectively. It should be noted that the lower spring seat 31 is axially positioned by having a rounded portion 31a thereof abutted against the reduced-diameter portion 29d of the second protecting cover member 29. A ring member 33 is slidably fitted around the outer peripheral surface of the second cylinder 3. The ring member 33 is secured at its lower end to the cylindrical portion 29e of the second protecting cover member 29. The upper end of the ring member 33 is secured to the lower end of a dust boot 34 of synthetic resin attached at its upper end to the outer periphery of the flange 12 of the second tubular member 11. It should be noted that reference numeral 35 shown in FIG. 1 denotes a stud bolt for mounting the cylinder apparatus 1 to a vehicle body.

The above-described cylinder apparatus 1 is provided for each wheel of a four-wheel vehicle, for example. Left and right cylinder apparatuses 1 opposing each other in the vehicle width direction have their upper and lower chambers 5 and 6 piped in crosswise relation to each other. The pipe between the upper chamber 5 of the cylinder apparatus 1 for the vehicle's front left wheel and the lower chamber 6 of the cylinder apparatus 1 for the vehicle's front right wheel is communicated with the pipe between the upper chamber 5 of the cylinder apparatus 1 for the vehicle's rear left wheel and the lower chamber 6 of the cylinder apparatus 1 for the vehicle's rear right wheel. The pipe between the lower chamber 6 of the cylinder apparatus 1 for the vehicle's front left wheel and the upper chamber 5 of the cylinder apparatus 1 for the vehicle's front right wheel is communicated with the pipe between the lower chamber 6 of the cylinder apparatus 1 for the vehicle's rear left wheel and the upper chamber 5 of the cylinder apparatus 1 for the vehicle's rear right wheel.

Next, the operation of this embodiment will be explained. Here, let us explain the assembly procedure of the above-described cylinder apparatus 1.

Prior to the assembly of the protecting cover 27, the lower spring seat 31 is secured to the second protecting cover member 29 by press fitting. Further, the piston rod 7 and the shaft portion 25a of the mounting eye 25 are joined together by welding, and thereafter, the first protecting cover member 28 is joined to the shaft portion 25a of the mounting eye 25 by welding.

It should be noted that the first protecting cover member 28 is secured to the mounting eye 25 in a state where the shaft portion 25a of the mounting eye 25 is fitted into the shaft hole 30 of the bottom portion 28a and the bottom portion 28a is abutted against the end surface 25b (retaining seat) of the mounting eye 25. The assembly of internal machine components, i.e. the mounting eye 25, the piston rod 7, the first protecting cover member 28, the bottom cover member 8, etc., will hereinafter be referred to as "subassembly A".

First, the flange 12 of the second tubular member 11 is press-fitted at its inner periphery onto the second cylinder 3, and the lower end of the flange 12 is secured to the second cylinder 3 by welding to form a subassembly, which will hereinafter be referred to as "subassembly B". Into the subassembly B, the first tubular member 10, the upper chamber-side damping valve 9 and the first cylinder 2 are inserted from the lower side as seen in FIG. 1. Further, the subassembly A including the bottom cover member 8 is inserted into the subassembly B.

Next, the lower end of the second cylinder 3 is staked or caulked at positions 36 to close the lower ends of the first and second cylinders 2 and 3. As shown in FIG. 1, the length of the second protecting cover member 29 is sufficient to cover the staking portion 36 when the second protecting cover member 29 is secured to the first protecting cover member 28.

Next, the second protecting cover member 29 having the lower spring seat 31 press-fitted thereto is press-fitted to the inner periphery of the first protecting cover member 28. Thereafter, the coil spring 32, the bush members 22a and 22b, the upper spring seat 24 and the washer 23 are assembled to the lower spring seat 31 by being compressed from above using a jig.

Next, the plug member 15 accommodating the lower chamber-side damping valve 16 and so forth is fastened to the second tubular member 11 by thread engagement. Thus, the cylinder apparatus 1 is completed.

This embodiment offers the following advantages.

According to this embodiment, the metallic protecting cover 27 is formed from two axially split members, one of which is a first protecting cover member 28 secured to the mounting eye 25. The other is a second protecting cover member 29 shorter in overall length than each of the first and second cylinders 2 and 3 and having a predetermined gap between itself and the second cylinder 3. The second protecting cover member 29 is press-fitted into the first protecting cover member 28 secured to the mounting eye 25, thereby integrating the first and second protecting cover members 28 and 29 into the protecting cover 27.

In a related art cylinder apparatus such as that disclosed in the above-mentioned Japanese Patent Application Publication No. 2008-45738, for example, the overall length of the third cylinder (corresponding to the protecting cover 27 in this embodiment) is not less than the overall length of the second cylinder (corresponding to the second cylinder 3 in this embodiment). In addition, there is substantially no gap between the second and third cylinders. Therefore, it is impossible to perform staking, caulking or other processing on the end of the second cylinder after the third cylinder has been temporarily assembled to the second cylinder. Accordingly, such a related art cylinder apparatus has a prerequisite condition that the third cylinder should be installed after the necessary processing has been performed on the end of the second cylinder. Thus, the related art has a low degree of freedom in assembling and hence has difficulty in streamlining the manufacturing process.

In contrast, this embodiment allows the lower end of the second cylinder 3 to be subjected to processing (e.g. staking or caulking) with the second protecting cover member 29 temporarily assembled to the second cylinder 3. Thus, this embodiment has a high degree of freedom in assembling and can meet the demand for streamlining of the manufacturing process.

Further, in this embodiment, the piston rod 7 is joined to the shaft portion 25a of the mounting eye 25 having an outer diameter larger than that of the piston rod 7, and the first protecting cover member 28 is joined to the shaft portion 25a at a position below the joint 26 between the piston rod 7 and the shaft portion 25a (i.e. at a position closer to the mounting eye body). Therefore, only a portion (shaft portion 25a) where a large stress is generated is formed to have a large outer diameter, thereby allowing minimization of the outer diameter of the piston rod 7. Thus, it is possible to reduce the weight of the piston rod 7 and hence the overall weight of the cylinder apparatus 1 and to suppress the increase in the manufacturing cost.

Further, because the mounting eye 25 is formed in a horseshoe shape, a force acting on the first protecting cover member 28 axially downward can be received by the end surface 25b (retaining seat) of the mounting eye 25. Thus, it is possible to ensure the required rigidity of the support structure of the protecting cover 27 and to reduce the stress acting on the joint 26 between the piston rod 7 and the mounting eye 25.

Further, because the lower spring seat 31 is secured to the second protecting cover member 29 by press fitting, the freedom of axial installation position of the lower spring seat 31 increases in comparison to the above-described related art.

The axial length of the first protecting cover member 28 is as follows: The first protecting cover member 28 has an axial length that allows the staking or caulking portions 36 to be accessible when the piston rod 7 projects to a maximum out of the first and second cylinders 2 and 3 in a state where the piston rod 7 has been inserted into the first and second cylinders 2 and 3 and the first protecting cover member 28 has been secured to either the piston rod 7 or the mounting eye 25. Therefore, the staking or caulking portions 36 can be staked or caulked after the first protecting cover member 28 has been welded to the piston rod 7. Accordingly, the welding of the first protecting cover member 28 to the piston rod 7 can be performed before the piston rod 7 is inserted into the first and second cylinders 2 and 3, and hence the manufacturing process can be streamlined.

It should be noted that the present invention is not limited to the foregoing embodiment but can be modified, for example, as follows.

The first protecting cover member 28 may be secured to the piston rod 7 to construct the cylinder apparatus 1.

The first protecting cover member 28 may be press-fitted into the second protecting cover member 29 in reverse relation to that in the foregoing embodiment to form the integrated protecting cover 27. Although in the foregoing embodiment the lower spring seat 31 is secured to the second protecting cover member 29 by press fitting, these members may be secured to each other by welding.

The above-described manufacturing method is merely an example of the present invention. The order of the steps in the assembly procedure may be changed according to need.

As has been stated above, the foregoing embodiment can provide a cylinder apparatus capable of ensuring the required strength of the protecting cover and of increasing the degree of freedom in the manufacturing process.

Although only some exemplary embodiments of this invention have been described in detail above, those skilled in the art will readily appreciate that many modifications are possible in the exemplary embodiments without materially departing from the novel teaching and advantages of this invention. Accordingly, all such modifications are intended to be included within the scope of this invention.

The present application claims priority under 35 U.S.C. section 119 to Japanese Patent Application No. 2009-155721 filed on Jun. 30, 2009.

The entire disclosure of Japanese Patent Application No. 2009-155721 filed on Jun. 30, 2009 including specification, claims, drawings and summary is incorporated herein by reference in its entirety.

What is claimed is:

1. A cylinder apparatus comprising:
   a cylinder;
   a piston fitted in the cylinder;
   a piston rod secured at one end thereof to the piston, the other end of the piston rod configured to project out of the cylinder and to be connected to a mounting member; and
   a protecting cover configured to cover the piston rod and at least a portion of the cylinder;
   the protecting cover including a first protecting cover member and a second protecting cover member split from each other in an axial direction of the piston rod, the first protecting cover member and the second protecting cover member being fittingly connectable to each other;
   the first protecting cover member being secured to one of the piston rod and the mounting member;
   the second protecting cover member having an overall length shorter than that of the cylinder and being secured to the first protecting cover member with a predetermined radial gap between itself and the cylinder;
   the cylinder apparatus further comprising:
   a dust boot connected to an opening end of the second protecting cover member, the dust boot covering the cylinder; and
   a spring seat provided on an outer periphery of the second protecting cover member,
   wherein an end of the cylinder, from which the other end of the piston rod projects out of the cylinder, is provided with a staking portion,
   wherein when the piston rod projects to a maximum out of the cylinder, the first protecting cover member has an axial length that allows the staking portion to be accessible, and the second protecting cover member has a length to cover the staking portion,
   wherein, when the first protecting cover member is fittingly connected with the second protecting cover member the first protecting cover member and the second protecting cover member include abutting portions, which are axially tightly in abutment with each other, and cylindrical portions which axially extend and are radially tightly in abutment with each other,
   wherein the second protecting cover member is urged to the first protecting cover member by a spring seated on the spring seat, and
   wherein the first protecting cover member is secured to the second protecting cover member by the abutting portions being axially tightly in abutment with each other and by the cylindrical portions being tightly in abutment with each other.

2. The cylinder apparatus of claim 1, wherein the second protecting cover member is secured to the first protecting cover member by the second protecting cover member being press-fitted into an inner periphery of the first protecting cover member such that the abutting portions are axially tightly in abutment with each other and the cylindrical portions are tightly in abutment with each other.

3. The cylinder apparatus of claim 2, wherein the mounting member has a horseshoe shape with an end surface serving as a retaining seat for retaining the first protecting cover member;
   the mounting member being provided on the end surface with a shaft portion fitted in a shaft hole formed in the first protecting cover member, the shaft portion having an outer diameter larger than that of the piston rod;
   the piston rod being connected to the shaft portion of the mounting member;
   the first protecting cover member being abutted against the end surface of the mounting member and secured to the mounting member.

4. The cylinder apparatus of claim 1, wherein the mounting member has a horseshoe shape with an end surface serving as a retaining seat for retaining the first protecting cover member;
   the mounting member being provided on the end surface with a shaft portion fitted in a shaft hole formed in the first protecting cover member, the shaft portion having an outer diameter larger than that of the piston rod;
   the piston rod being connected to the shaft portion of the mounting member; and
   the first protecting cover member being abutted against the end surface of the mounting member and secured to the mounting member.

5. A method of manufacturing a cylinder apparatus, the cylinder apparatus including:
   a cylinder;
   a piston fitted in the cylinder;
   a piston rod secured at one end thereof to the piston, the other end of the piston rod being configured to project out of the cylinder and to be connected to a mounting member; and
   a protecting cover configured to cover the piston rod and at least a portion of the cylinder;
   the protecting cover including a first protecting cover member and a second protecting cover member split from each other in an axial direction of the piston rod, the first protecting cover member and the second protecting cover member being fittingly connectable to each other;
   the first protecting cover member being secured to one of the piston rod and the mounting member;

the second protecting cover member having an overall length shorter than that of the cylinder and being secured to the first protecting cover member with a predetermined radial gap between itself and the cylinder;

the cylinder apparatus further comprising:

a dust boot connected to an opening end of the second protecting cover member, the dust boot covering the cylinder; and a spring seat provided to an outer periphery of second protecting cover member, wherein an end of the cylinder, from which the other end of the piston rod projects out of the cylinder, is provided with a staking portion, wherein when the piston rod projects to a maximum out of the cylinder, the first protecting cover member has an axial length that allows the staking portion to be accessible, and the second protecting cover member has a length to cover the staking portion, wherein when the first protecting cover member is fittingly connected with the second protecting cover member the first protecting cover member and the second protecting cover member include abutting portions, which are axially tightly in abutment with each other, and cylindrical portions, which axially extend and are radially tightly in abutment with each other, wherein the second protecting cover member is urged to the first protecting cover member by a spring seated on the spring seat, and wherein the first protecting cover member is secured to the second protecting cover member by the abutting portions being axially tightly in abutment with each other and by the cylindrical portions being tightly in abutment with each other, the method comprising the steps of:

securing a spring seat to an outer periphery of the second protecting cover member by press fitting;

temporarily assembling the second protecting cover member to an outer periphery of the cylinder; and securing the first protecting cover member to one of the piston rod and the mounting member by welding and staking an end of the cylinder from which the piston rod projects out of the cylinder and, thereafter, securing the second protecting cover member, which has been temporarily assembled, to the first protecting cover member by press fitting.

* * * * *